June 25, 1957  L. N. SMITH  2,797,001
VEHICLE MOUNTED APPARATUS FOR HANDLING CUT FORAGE
Filed June 15, 1955  3 Sheets-Sheet 1
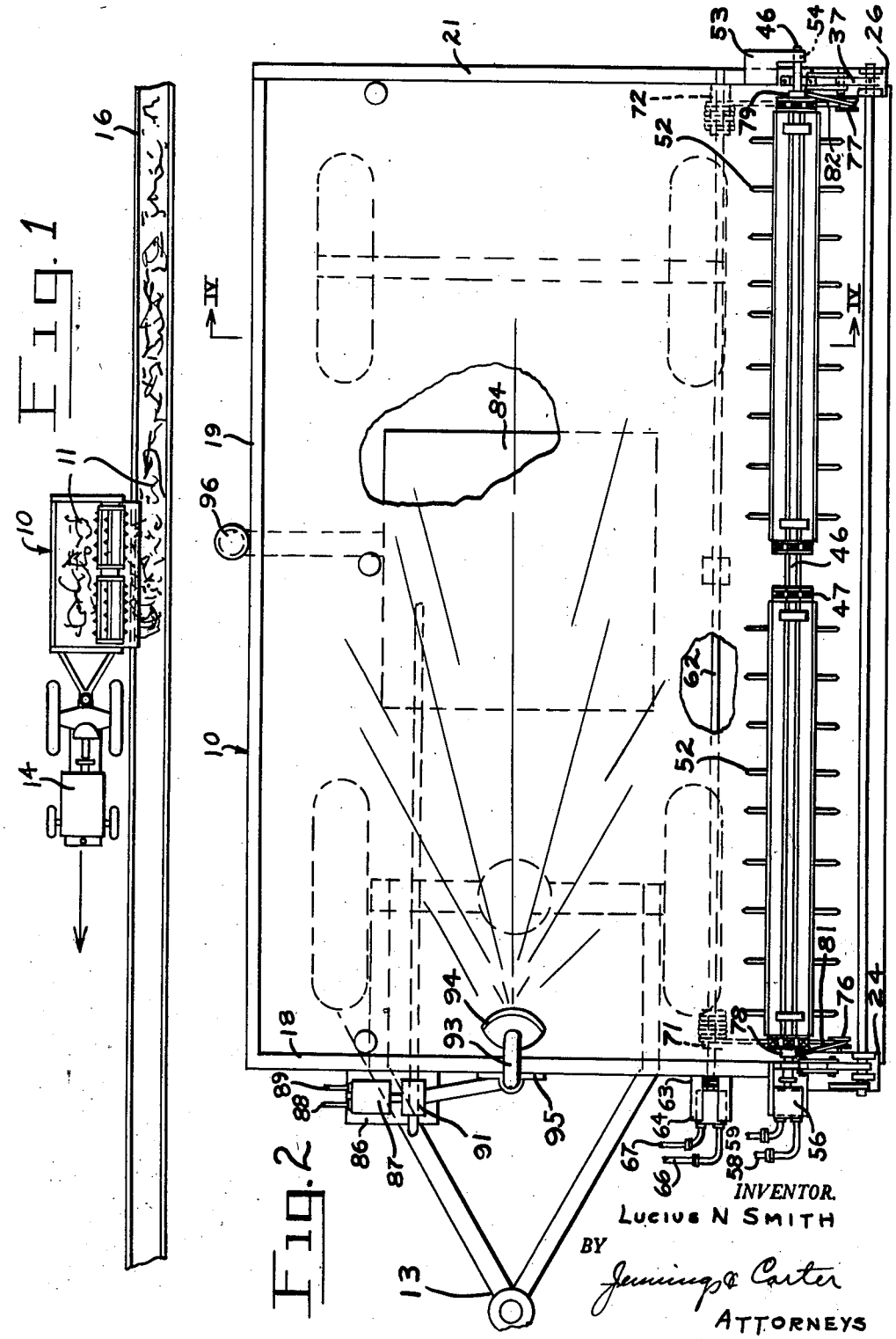
INVENTOR.
Lucius N Smith
BY
Jennings & Carter
ATTORNEYS June 25, 1957 L. N. SMITH 2,797,001
VEHICLE MOUNTED APPARATUS FOR HANDLING CUT FORAGE
Filed June 15, 1955 3 Sheets-Sheet 2

INVENTOR.
LUCIUS N. SMITH
BY
Jennings & Carter
ATTORNEYS

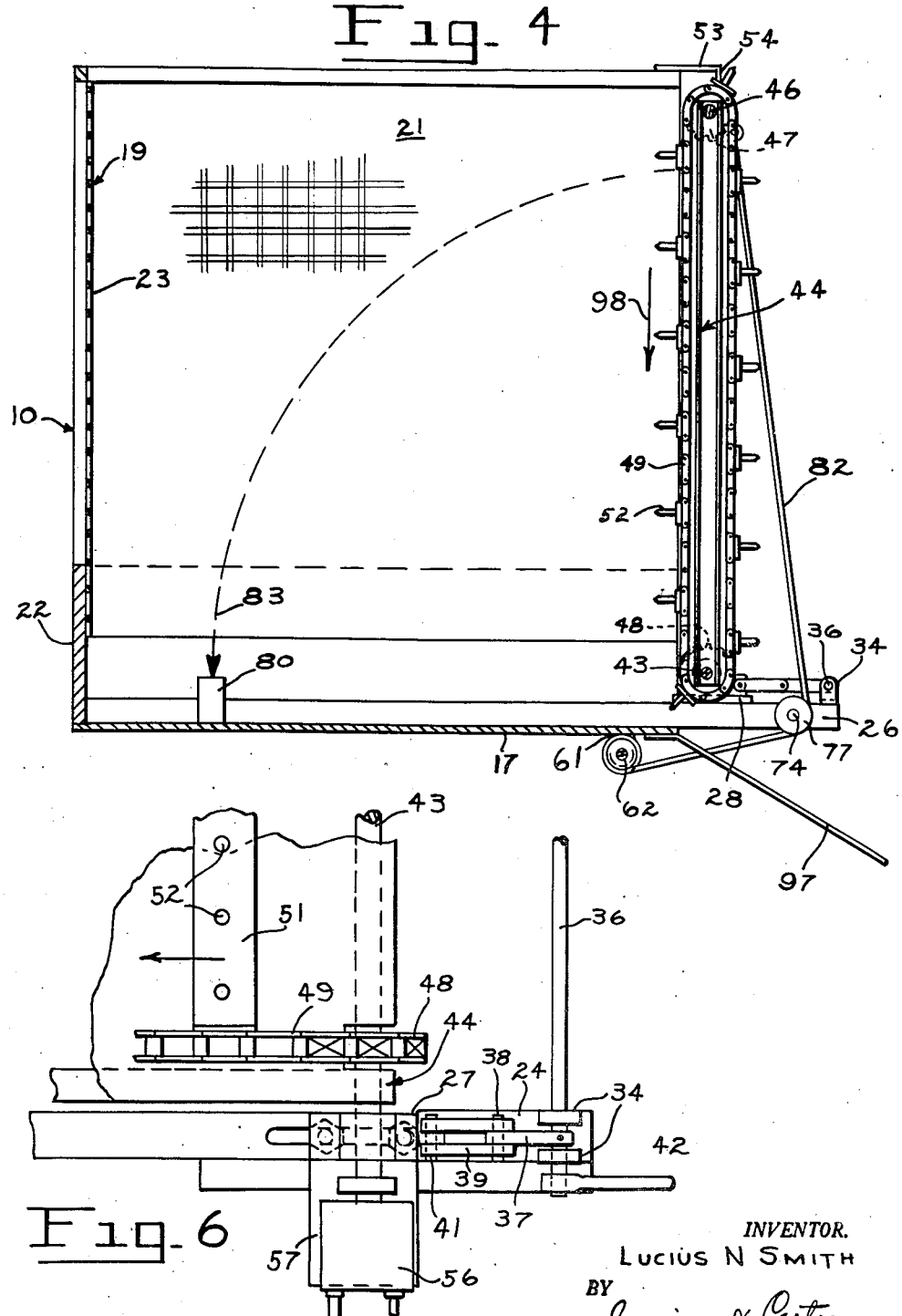

United States Patent Office 2,797,001
Patented June 25, 1957

2,797,001

VEHICLE MOUNTED APPARATUS FOR HANDLING CUT FORAGE

Lucius N. Smith, Montverde, Fla.

Application June 15, 1955, Serial No. 515,717

8 Claims. (Cl. 214—83.36)

This invention relates to apparatus for handling cut forage and the like and has for an object the provision of improved means for receiving the forage as it is cut, transporting the same to a feeding location and then discharging the same in an expedient manner.

A more specific object of my invention is to provide apparatus for handling cut forage and the like which shall be particularly adapted for unloading the forage evenly and continuously into an elongated feed trough.

A further object of my invention is to provide forage handling apparatus of the character designated which shall be adapted to apply a uniform amount of a fluid material to the forage.

A still further object of my invention is to provide apparatus of the character designated which shall be simple of construction, economical of manufacture and adapted for use with conventional type tractors.

It has lately become a common practice to feed cut forage to large numbers of cattle from a long feed trough of a length to accommodate the cattle instead of allowing the cattle to graze and trample down and otherwise damage the forage. It has been found that more meat and milk can be produced by cutting the forage, such as grasses and the like, and hauling the same to the cattle rather than permitting the cattle to graze in the hot sun. In fact, some dark colored cattle which absorb the sun's rays more readily than the lighter colored cattle will not graze in the hot sun. Accordingly, it is more productive to place an elongated feed trough in a shade and haul the cut forage to the trough where the cattle can eat throughout the day. Furthermore, cattle fatten quicker when they do not have to graze over large areas.

One of the major problems encountered in handling cut forage has been the provision of effective means to discharge the forage in an even and continuous manner along the feed trough. Not only has the distribution of the cut forage entailed prohibitive labor cost but the forage is thus distributed in an uneven manner, making it difficult for some cattle to get to the feed while other cattle have more than they can eat thus incurring waste of the feed.

Briefly, my improved apparatus for handling cut forage and the like comprises a vehicle for receiving the forage and transporting the same to a feeding location. Means is provided on the vehicle for spraying the forage with a suitable liquid as it is loaded. An upstanding endless conveyor unit is pivotally mounted at its lower end to one side of the vehicle and is driven in a direction for the innermost flight thereof to move toward the pivoted end of the conveyor unit. The lower end of the conveyor unit is adapted to shift outwardly of the vehicle whereby a discharge passageway is provided between the conveyor unit and the bottom of the vehicle and the conveyor unit is disengaged from the tight load of forage so that the same may be discharged. A discharge chute is provided beneath the passageway in position to convey the forage into a feed trough as the vehicle is moved alongside the same. As the forage is discharged, the free end of the conveyor unit is lowered onto the forage, thus moving downwardly as the forage is removed.

Apparatus embodying features of my invention is shown in the accompanying drawings, forming a part of this application, in which:

Fig. 1 is a plan view showing the unloader discharging forage into the feed trough;

Fig. 2 is an enlarged plan view of the unloader;

Fig. 4 is a sectional view taken along the line IV—IV of Fig. 2, and drawn to a larger scale;

Fig. 6 is a fragmental sectional view taken generally along the line VI—VI of Fig. 5.

Figure 3:
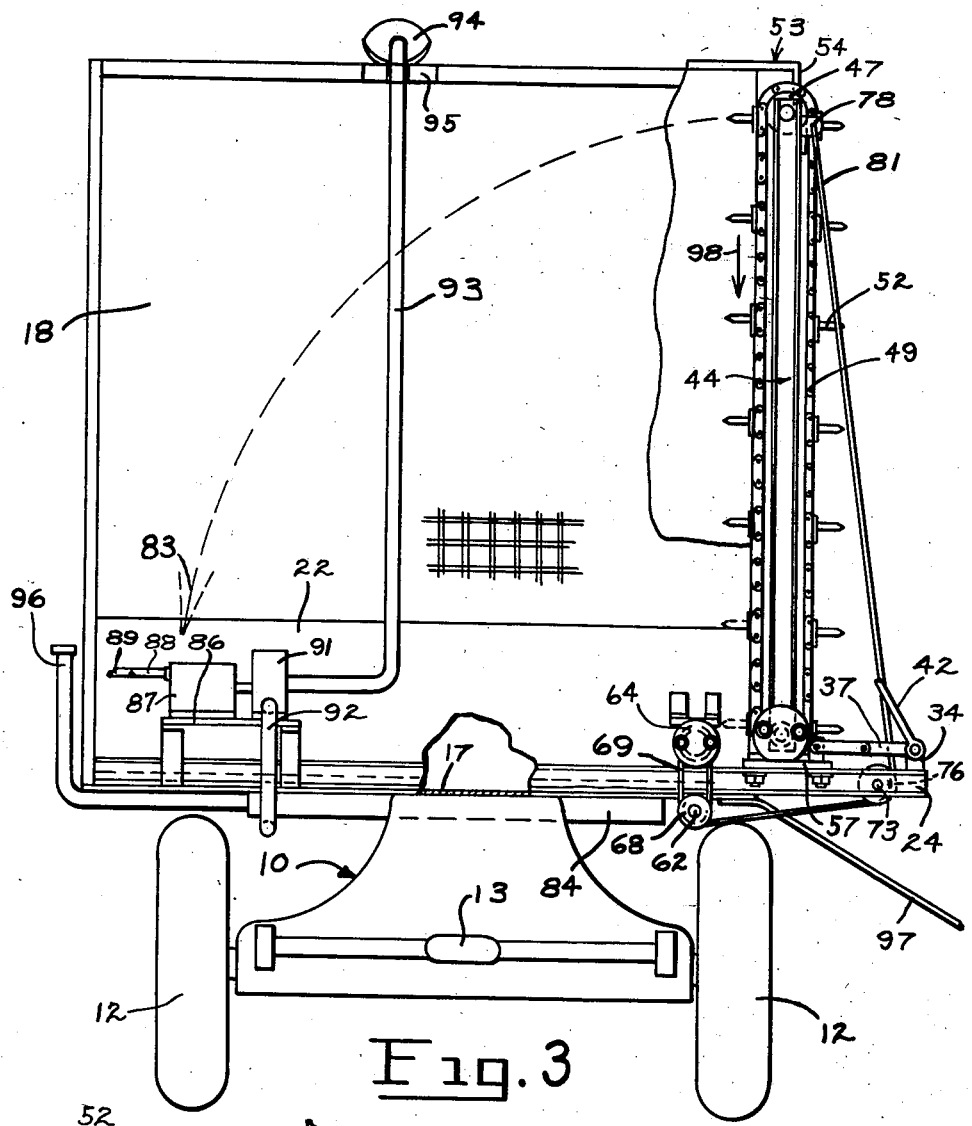
Fig. 3 is a front elevational view, partly broken away and in section.

Referring now to the drawings for a better understanding of my invention, I show a vehicle 10 for receiving the forage indicated generally at 11. The vehicle 10 is mounted on wheels 12 and is provided with a suitable draw bar 13 for connecting the same to a tractor 14, or other suitable traction means. Also, the vehicle can form a part of a truck by mounting the forage receiving means directly on the truck. As shown in Fig. 1, the vehicle 10 is pulled alongside an elongated feed trough 16 as the forage is discharged into the same. The load receiving portion of the vehicle 10 is provided with a bottom wall 17, fixed end walls 18, and 21, and one fixed side wall 19. Preferably, the lower portions of the fixed end walls and side wall 19 are formed of boards 22 and the upper portions are formed of reticulated material 23, such as reticulated metal.

The fourth side of the load receiving portion, opposite the side 19, is formed by a belt conveyor assembly, presently to be described. Extending outwardly from the other side of the vehicle beneath and in alignment with the fixed end walls 18 and 21 are channel members 24 and 26, respectively. Mounted on the channel members 24 and 26 outwardly of the fixed end walls are bearing blocks 27 and 28. Each of the channel members 24 and 26 is provided with a longitudinally extending opening 29 in the upper surface thereof for receiving downwardly projecting studs 31 secured to the undersurface of the bearing blocks, whereby the bearing blocks are adapted to shift longitudinally of the channel members. The bearing blocks 27 and 28 are held against vertical movement by means of bolts 32 and washers 33.

Mounted on the outer ends of each of the channel members 24 and 26 is a pair of upstanding brackets 34 having suitable openings therethrough for receiving a shaft 36. Rigidly secured to the shaft 36 intermediate each pair of brackets 34 are arm members 37. Pivotally connected to the free ends of the arms 37 by means of pivot pins 38 are the ends of link members 39. The other ends of the link members 39 are pivotally connected to the bearing blocks 27 and 28 by means of pivot pins 41. Rigidly secured to the shaft 36 is an operating lever 42 for actuating the shaft 36 whereby the bearing blocks 27 and 28 may be shifted along the channel members.

Mounted for rotation in the bearing blocks 27 and 28 and extending alongside the bottom wall 17 of the vehicle is a shaft 43. Mounted for pivotal movement on the shaft 43 intermediate the bearing blocks 27 and 28 are conveyor frame units indicated generally at 44. Mounted for rotation in suitable bearings at the upper ends of the conveyor frame units 44 is a shaft 46 having sprockets 47 mounted thereon. Mounted rigidly on the shaft 43 in vertical alignment with the sprockets 47 are sprockets 48. Passing over the vertical aligned sprockets 47 and 48 are endless sprocket chains 49. Connecting the sprocket chains 49 are transverse slats 51 carrying outwardly projecting carrier elements in the form of spikes 52.

Secured to the upper end of the fixed end wall 21 and projecting outwardly over the shaft 46 is a bracket 53 having a downturned end 54 which engages the shaft 46 and limits outward movement thereof. Preferably, I employ two conveyor units 44, both of which are mounted on the shafts 43 as shown. Also, the upper shaft 46 extends through both conveyor units.

The conveyor units are driven by a fluid pressure motor 56 mounted on a plate 57 attached to the channel member 24 by any suitable means such as by welding. The fluid pressure motor 56 is connected directly to the shaft 43 and is connected to the fluid pressure system of the tractor 14 by means of flexible supply and return conduits 58 and 59. The flow of fluid through the conduits 58 and 59 is controlled by a suitable valve, not shown, positioned on the tractor 14.

Figure 5:
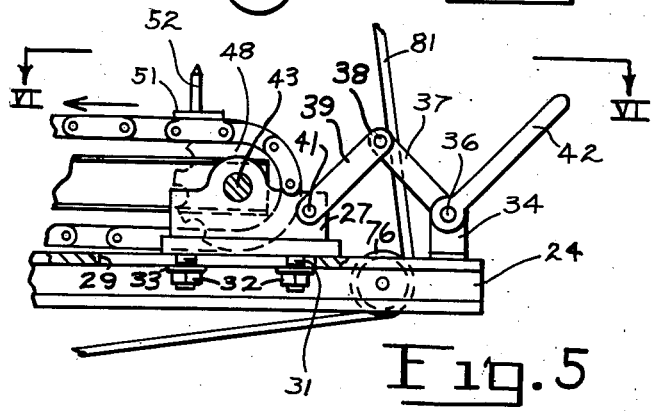
Fig. 5 is an enlarged fragmental view showing the conveyor unit in lowered position, together with the means for shifting the conveyor unit relative to the vehicle.

Secured to the undersurface of the bottom wall 17 of the load receiving portion of the vehicle are bearing members 61 for supporting a shaft 62 which extends substantially parallel to the shaft 43. Secured to the channel member 24 and projecting forwardly thereof is a plate 63 for supporting a fluid pressure motor 64 which is connected to the fluid pressure system of the tractor 14 by means of flexible conduits 66 and 67. The flow of fluid through the conduit 66 and 67 is also controlled by suitable valves, not shown, positioned on the tractor 14. Mounted on the shaft 62 is a pulley 68 which is connected in driving relation with the fluid pressure motor 64 by means of a belt 69. Mounted on the shaft 62 adjacent the forward and rear ends of the vehicle are drums 71 and 72. Secured to the channel members 24 and 26 adjacent the outer ends thereof are inwardly projecting stub shafts 73 and 74 having pulleys 76 and 77 mounted for rotation thereon. Mounted at the upper ends of the conveyor frame units 44 in substantially vertical alignment with the pulleys 76 and 77 are brackets 78 and 79 to which are connected the ends of cables 81 and 82. As shown in Figs. 3, 4 and 5, the cables 81 and 82 pass around and beneath the pulleys 76 and 77 and the lower ends thereof are wound about the drums 71 and 72, as shown. It will thus be seen that as the fluid pressure motor 64 is driven in one direction, the free end of the conveyor unit 44 is lowered into the vehicle, as shown by the arrow 83 in Figs. 3 and 4 and when the fluid pressure motor 64 is driven in the opposite direction the conveyor unit is moved to the vertical position, thus defining a fourth wall for the vehicle. Suitable stop members 80 are provided in the bottom of the vehicle which engage the free end of the conveyor unit and prevent the spikes 52 from engaging the bottom wall 17.

Mounted beneath the bottom wall 17 of the vehicle is a supply tank 84 for molasses or other suitable liquid to be sprayed onto the forage as it is placed in the vehicle. Secured to the forward end of the vehicle 10 is a plate 86 for supporting a fluid pressure motor 87. Fluid under pressure is supplied to the motor 87 by suitable flexible conduits 88 and 89 which are in communication with the fluid pressure system of the tractor 14. The flow of fluid through the conduits 88 and 89 is also controlled by suitable valves positioned on the tractor 14. The fluid pressure motor 87 drives a pump 91 which is connected to the supply tank 84 by means of a conduit 92. Connected to the discharge end of the pump 91 is a conduit 93 having a spray nozzle 94 at its upper end. The conduit 93 is attached to the forward wall 18 of the vehicle by means of a suitable strap 95. The molasses is introduced into the tank 84 through an inlet conduit 96.

Secured to the undersurface of the bottom wall 17 and projecting outwardly and downwardly beneath the conveyor unit 44 is a discharge chute 97. As shown in Figs. 3 and 4, the conveyor unit 44 is positioned adjacent the bottom wall 17 while the forage is being loaded and transported, thus preventing the forage from being discharged until the conveyor unit is shifted outwardly of the vehicle.

From the foregoing description, the operation of my improved apparatus for handling cut forage and the like, will be readily understood. To load the forage the vehicle 10 is drawn behind a suitable cutter which blows the forage into the vehicle. During the loading operation, the conveyor unit is in the vertical position as shown in Figs. 3 and 4, thus defining a fourth wall for the vehicle. As the forage is introduced, fluid is introduced into the fluid pressure motor 87 thus operating the pump 91 to spray the molasses onto the forage in a uniform manner.

The vehicle is next taken to the feed trough and positioned with the discharge chute 97 overhanging the trough, as shown in Fig. 1. The operating lever 42 is rotated in a clockwise direction, as shown in Fig. 5, thus shifting the lower end of conveyor unit 44 outwardly of the vehicle thereby providing a discharge opening adjacent the bottom 17. Fluid under pressure is next introduced into the fluid pressure motor 56 in a direction to cause the innermost flight of the conveyor unit to move downwardly toward the shaft 43, as shown by the arrow 98 in Figs. 3 and 4. As the conveyor chains carrying the transverse slats 51 and spikes 52 are set in motion, the forage is discharged through the opening provided between the lower end of the conveyor unit 44 and the bottom wall 17. The forage then passes over the discharge chute 97 into the feed trough 16 in an even and continuous manner. This is accomplished by moving the vehicle slowly alongside the feed trough as the forage is discharged.

As soon as the conveyor unit 44 is set into motion, the fluid pressure motor 64 is energized causing the shaft 62 to rotate in a direction to unwind the cables 81 and 82 from the drum 71 and 72, thus causing the free ends of the conveyor units to move downwardly into the vehicle as the forage is discharged. That is to say, the spikes 52 of the conveyor unit are in constant contact with the adjacent surface of the forage whereupon it conveys the same through the discharge opening defined between the pivoted end of the conveyor unit and the bottom wall of the vehicle. The conveyor unit 44 thus continues to move downwardly until it contacts the upper end of the stop members 80 which prevent the spikes from engaging the bottom wall 17. After the forage has been discharged into the feed trough 16, fluid is introduced into the fluid pressure motor 64 in a direction to reverse the rotation of the shaft 62 thereby winding the cables 81 and 82 about the drums 71 and 72 and causing the conveyor units 44 to move to the raised position, as shown in Figs. 3 and 4. The conveyor units 44 thus define a fourth wall for the vehicle and the apparatus is ready to receive a new load of forage.

From the foregoing, it will be apparent that I have devised improved apparatus for handling cut forage, and the like, which is simple of construction and operation and which is adapted to distribute the forage in an even and continuous manner along an elongated feed trough. By providing a conveyor unit pivotally mounted at its lower end adjacent the bottom of the vehicle together with means for shifting the conveyor relative to the vehicle, I provide effective means for discharging the forage into the trough and at the same time provide a discharge passageway through which the forage passes as it is discharged. Furthermore, by shifting the conveyor unit outwardly relative to the vehicle, the spike carrier elements 52 are disengaged temporarily from the packed load of forage, thus permitting free operation of the conveyor unit during the initial discharge of the forage. Also, by providing means for lowering the conveying unit onto the forage as it is discharged, the conveying unit is in continuous contact with the forage thus assuring continuous and uniform discharge of the forage from the apparatus.

While I have described the conveyor unit 44 as being at a side of the vehicle, it will be apparent that the same may be positioned at the rear or forward end of the vehicle so that the forage or other suitable material can be spread evenly upon the ground or in a suitable trough as the vehicle is pulled over the same.

While I have shown and described the apparatus as being driven by fluid pressure means, other means of operative power may be employed, such as electric power, an internal combustion engine or power take-off from the traction means.

While I have shown my invention in but one form, it will be obvious to those skilled in the art that it is not so limited but is susceptible of various changes and modifications without departing from the spirit thereof, and I desire, therefore, that only such limitations shall be placed thereupon as are specifically set forth in the appended claims.

What I claim is:

1. In apparatus for handling cut forage and the like, a vehicle for receiving the forage, means spraying a fluid material onto the forage as it is placed in said vehicle, an upstanding endless conveyor unit pivotally mounted at its lower end adjacent a side of said vehicle, means driving said conveyor unit in a direction for its innermost flight to move toward the pivoted end thereof, means to shift the pivoted end of the conveyor unit outwardly of the vehicle to define a discharge passageway between the pivoted end of said conveyor unit and said vehicle and to disengage the conveyor unit from the forage sufficiently to permit discharge thereof by the conveyor unit, and means to lower the free end of said conveyor unit onto the forage as it is discharged and to raise the free end thereof after the forage is discharged.

2. In an unloader for cut forage and the like, a vehicle for receiving the forage, bearing members mounted at one side of the vehicle adjacent the bottom thereof, means to shift said bearing members inwardly and outwardly of said side of the vehicle, an endless conveyor unit pivotally mounted at its lower end in said bearing members and defining a side wall for the vehicle, means driving said conveyor unit in a direction for its innermost flight to move toward said bearing members, and means to lower the free end of said conveyor unit onto said forage as it is discharged and to raise the free end thereof after the forage is discharged.

3. In an unloader for cut forage and the like, a vehicle for receiving the forage, bearing support members mounted at the bottom of the vehicle and projecting outwardly from a side thereof, bearing members mounted for sliding movement on said support members, means to shift said bearing members along said support members, a transverse shaft mounted for rotation in said bearing members, a conveyor frame mounted for pivotal movement on said shaft and defining a side wall for the vehicle, sprockets fixedly mounted on said shaft, other sprockets mounted for rotation adjacent the free end of the conveyor frame, endless sprocket chains connecting the fixedly mounted sprockets in driving relation with said other sprockets, carrier elements on said sprocket chains, means driving said shaft in a direction for the innermost flights of said sprocket chains to move toward said shaft, and means to lower the free end of said conveyor frame onto said forage as it is discharged and to raise the free end thereof after the forage is discharged.

4. In an unloader for cut forage and the like, a vehicle for receiving the forage, bearing support members mounted at the bottom of the vehicle and projecting outwardly from a side thereof, bearing members mounted for sliding movement on said support members, a transverse shaft mounted for rotation in said bearing members, a conveyor frame mounted for pivotal movement on said shaft, sprockets fixedly mounted on said shaft, other sprockets mounted for rotation adjacent the free end of the conveyor frame, endless sprocket chains connecting the fixedly mounted sprockets in driving relation with said other sprockets, carrier elements on said sprocket chains, means driving said shaft in a direction for the innermost flights of said sprocket chains to move toward said shaft, a second shaft mounted for rotation adjacent the outer ends of said support members, arms fixedly secured to said second shaft, links pivotally connecting the free ends of said arms to said bearing members, an operating arm fixedly secured to said second shaft, and means to lower the free end of said conveyor frame onto said forage as it is discharged.

5. In an unloader for cut forage and the like, a vehicle for receiving the forage, bearing support members mounted at the bottom of the vehicle and projecting outwardly from a side thereof, bearing members mounted for sliding movement on said support members, means to shift said bearing members along said support members, a transverse shaft mounted for rotation in said bearing members, a conveyor frame mounted for pivotal movement on said shaft, sprockets fixedly mounted on said shaft, other sprockets mounted for rotation adjacent the free end of the conveyor frame, endless sprocket chains connecting the fixedly mounted sprockets in driving relation with said other sprockets, carrier elements on said sprocket chains, means driving said shaft in a direction for the innermost flights of said sprocket chains to move toward said shaft, pulleys mounted on the support members, drum members mounted for rotation adjacent the bottom of the vehicle, cables secured at one end to the free end of said conveyor frame and passing under said pulleys with the other ends thereof wound about said drum members, and drive means operatively connected to said drum members for rotating the same whereby the free end of the conveyor frame is raised and lowered.

6. In a vehicle for handling cut forage, a load receiving portion embodying fixed end walls, one fixed side wall and a bottom, an upstanding conveyer unit forming the other side wall and comprising endless conveyer elements with forage engaging members thereon, pivotal mounting means for the lower end of the conveyer-unit disposed adjacent the bottom and along the side of the load receiving portion, means to shift the pivotal mounting means outwardly and inwardly of said bottom thereby to form a discharge opening when unloading forage and to close said opening when transporting forage, and means to drive the conveyer unit when unloading in a direction to engage the forage and move it toward the discharge opening.

7. In a vehicle for handling cut forage, a load receiving portion embodying fixed end walls, one fixed side wall and a bottom, an upstanding conveyer unit forming the other side wall and comprising endless conveyer elements with forage engaging members thereon, pivotal mounting means for the lower end of the conveyer unit disposed adjacent the bottom and along the side of the load receiving portion, means to shift the pivotal mounting means outwardly and inwardly of said bottom thereby to form a discharge opening when unloading forage and to close said opening when transporting forage, means to swing the free upper end of the conveyer unit about its pivotal mounting from a vertical position inwardly and downwardly of the load receiving portion, and means to drive the conveyer unit when unloading in a direction to engage the forage and move it toward the discharge opening.

8. Apparatus as defined in claim 7 in which the means to shift the pivotal mounting means comprises a shaft for the lower end of the conveyer means extending the length of the vehicle, outwardly extending bearing supports at each end of the vehicle, bearings for the shaft slidably mounted on said supports, and means to shift the bearings on said supports.

References Cited in the file of this patent
UNITED STATES PATENTS

| | | |
|---|---|---|
| 483,408 | Mallon | May 25, 1897 |
| 892,593 | Keller | July 7, 1908 |
| 2,079,814 | Renault | May 11, 1937 |
| 2,458,031 | Rome | Jan. 4, 1949 |
| 2,496,876 | Kayser | Feb. 7, 1950 |
| 2,511,246 | Chamberlain | June 13, 1950 |
| 2,711,262 | Bing | June 21, 1955 |